United States Patent [19]
Younker

[11] Patent Number: 5,118,078
[45] Date of Patent: Jun. 2, 1992

[54] BUTTERFLY VALVE HAVING IMPROVED SEALING CHARACTERISTICS
[75] Inventor: Paul M. Younker, El Cajon, Calif.
[73] Assignee: Tylan General, Inc., San Diego, Calif.
[21] Appl. No.: 701,200
[22] Filed: May 16, 1991
[51] Int. Cl.⁵ .............................................. F16K 1/228
[52] U.S. Cl. .................................... 251/160; 251/163; 251/84
[58] Field of Search ............... 251/158, 160, 162, 163, 251/84, 192

[56] References Cited
U.S. PATENT DOCUMENTS

| | | | |
|---|---|---|---|
| 3,008,685 | 11/1961 | Rudden | 251/160 |
| 3,185,435 | 5/1965 | Hauser | |
| 3,216,694 | 11/1965 | Perazone | |
| 3,237,916 | 3/1966 | Bryant | |
| 3,321,174 | 5/1967 | Schertler | |
| 3,368,792 | 2/1968 | Schertler | |
| 3,531,083 | 9/1970 | Rohrer | |
| 3,583,669 | 6/1971 | Topham et al. | 251/163 |
| 3,776,505 | 12/1973 | Nakanishi | |
| 3,780,983 | 12/1973 | Topham et al. | 251/163 |
| 3,963,213 | 6/1976 | Brattberg | |
| 4,052,036 | 10/1977 | Schertler | |
| 4,167,263 | 9/1979 | Cupedo | |
| 4,291,861 | 9/1981 | Faria | |
| 4,470,576 | 9/1984 | Schertler | |
| 4,560,141 | 12/1985 | Bösch | |
| 4,634,094 | 1/1987 | Geiser | |
| 4,817,916 | 4/1989 | Rawstron | |
| 4,921,212 | 5/1990 | deQuay | |

Primary Examiner—John C. Fox
Attorney, Agent, or Firm—Knobbe, Martens, Olson & Bear

[57] ABSTRACT

A fully sealing butterfly valve throttles flow rates through a flow channel and completely ceases flow. A throttle plate rotates into a close position and then moves axially to seat against a seal. The axial movement directly corresponds to rotation of an actuator shaft to improve valve control for the entire range of throttle plate movement from a full open position to a seal position. Additionally, the present butterfly valve employs a self-centering throttle plate adapted to float within the valve central bore. The throttle plate adjusts its positioning about an annular seal to achieve an effective seal entirely around its circumference.

22 Claims, 6 Drawing Sheets

BUTTERFLY VALVE HAVING IMPROVED SEALING CHARACTERISTICS

BACKGROUND OF THE INVENTION

1. Field of the Invention

The present invention generally relates to valves, and more particularly to full sealing throttle valves.

2. Description of Related Art

Butterfly valves are commonly used in industry to throttle flow rates in a flow channel by adjusting the position of a throttle plate within the channel. By rotating the throttle plate from a position parallel to the flow to a position perpendicular to the flow, the flow rate decreases. Positioned perpendicularly, however, the throttle plate by itself only impedes the flow, but does not stop it.

Because of the typical construction of butterfly valves, sufficient clearance must exist in the valve bore to permit unobstructed movement of the throttle plate in the bore. The necessary clearance, however, prevents the plate from fulling blocking the bore.

In many applications it is desirably to regulate and cease the flow through the flow channel. Previously, butterfly valves included an O-ring on the throttle plate periphery edge which compressed between the flow channel wall and the throttle plate periphery edge when closed. Although these designs produce somewhat effective seals, a control problem manifests because O-rings typically release pressure asymmetrically (i.e., release pressure on the leading edge of the throttle plate first) causing pressure spikes across the valve.

To overcome this problem, butterfly valve designs developed which rotate the throttle plate into the perpendicular position (i.e., a close position) and then axially translate the throttle plate to seat against a seal (i.e., translate into a seal position). Examples of butterfly valves with axial translation into a seal position are disclosed in U.S. Pat. Nos. 4,817,916 and 4,921,212.

U.S. Pat. No. 4,817,916 to Rawstron discloses a butterfly valve axially actuated by a cam mounted on the valve shaft. The cam cooperates with a cam chamber surface to rotate the throttle plate into a close position. In the close position, the cam rotates across the cam chamber and engages a second cam chamber surface. Continued rotation of the shaft with the cam engaging the second surface forces the throttle plate linearly into a seated position. The '212 patent functions in a similar manner.

Although the butterfly valves of these references disclose axially displacing the throttle plate to seal the plate, all of the designs produce additionally control problems because the control of throttle plate movement by the actuator shaft does not extend continuously over the entire range of shaft movement. In other words, the axial translation of the throttle plate does not directly correspond to rotation of the actuator shaft from the close position to the seal position.

The prior art devices are therefore susceptible to mechanical hysteresis because the throttle plate does not directly communicate with the shaft, i.e., during a portion of shaft rotation, the plate does not respond. Mechanical hysteresis produces control problems which lead to system instability.

Moreover, the prior art discloses massive throttle plate assemblies with inherently slow response time. As known in the art, the larger the mass of rotation, the slower the response time. In semiconductor processing, valve response time is essential in a vacuum system. Consequently, the prior art devices are not suited for such application.

Thus a need exists for a full sealing butterfly valve in which the axial translation of the throttle plate directly corresponds to the rotation of the actuator shaft to improve control of the valve over the entire range of throttle plate movement from a full open position to a seal position. In addition, a need exists for a butterfly valve having a quick response time.

SUMMARY OF THE INVENTION

The present invention defines a butterfly valve for throttling fluid flow through a conduit. The valve is coupled to a control system which regulates the flow rate by periodically adjusting the valve position. The valve comprises a valve body having a central bore and a seal disposed proximate to the valve body. A rotatable actuator shaft, disposed in the central border, couples to the control system to control the rotational position of the shaft. The valve additionally comprises a throttle plate rotatable within the central bore to a close position. The throttle plate couples to the actuator shaft to directly communicate rotational translation of the shaft to the throttle plate throughout the rotational travel of the throttle plate. In the close position, shaft rotation directly translates into axial displacement of the throttle plate to fully seat the plate against the seal.

In a preferred embodiment, the shaft spans across the central bore at a slightly offset position from the central bore diameter on a proximal side of the seal to prevent a circumferential edge of the throttle plate from wiping across the seal as the throttle plate opens from the close position. Preferably, the shaft directly translates rotational movement into axial displacement of the throttle plate via a transfer block and a pin coupling. The pin extends axially from the throttle plate in the proximal direction and positions to generally align with a circumferential edge of the shaft. The transfer block is disposed between a notch in the shaft and the pin, and is slidable within the notch to maintain contact with the pin as the shaft rotates past the close position.

It is also preferred that the throttle plate couples to the shaft by a coupling mechanism which biases the throttle plate towards the shaft to directly communicate rotation of the shaft to the throttle plate when rotating to and from the close position. Preferably, the coupling mechanism comprises a plurality of spring posts attached to a proximal side of the throttle plate, a plurality of biasing members, at least one member disposed about each post, and a platter connected to the shaft. The platter includes a plurality of apertures extending through the platter and correspondingly positioned to permit the post to extend through the platter when juxtaposed to the throttle plate. The biasing members attached onto the post in a position between a proximal end of the post and the platter to couple the throttle plate to the platter.

In accordance with another aspect of the present invention, the butterfly valve comprises a valve body having a central bore and an annular seal disposed proximate to the valve body. The valve additionally includes a rotatable actuator shaft coupled to a control system and a self-centering throttle plate coupled to the actuator shaft. The throttle plate is capable of floating within the central bore when in a closed position to achieve a uniform seal around the circumference of the throttle plate. In a preferred embodiment, the shaft spans across the central bore at a slightly off-center position from the bore diameter on a proximal side of the seal to prevent a circumferential edge of the throttle plate from wiping across the seal as the throttle plate opens from the close position.

The self-centering throttle plate preferably comprises a circular disk and a plurality of posts extending generally axially from the disk towards the shaft and positioned about equal distances from a center position of the disk and from one another. A platter connects to the shaft having a plurality of apertures extending through the platter and correspondingly positioned to permit the post to extend through the platter when juxtaposed to the disk. A plurality of biasing members affix on the posts in a position between a proximal end of the posts and the platter to couple the disk and platter together. At least one biasing member is disposed on each post. As a result, the disk floats within the central bore about the platter and the supporting post when in the close position.

Preferably, the throttle plate is rotatable within the central bore to the close position and couples to the shaft to directly communicate rotational translation of the shaft to the throttle plate throughout the rotational travel of the throttle plate. In the close position, the coupling directly translates rotation of the shaft to axially displace the throttle plate to fully seat the plate against the seal. Preferably, the throttle plate has a circumferential edge tapered towards the center of the plate in the distal direction to improve the seal between the edge and the annular seal.

A further aspect of the present invention includes a fully sealing butterfly valve adapted for application in high vacuum systems used in semi-conductor processing. The butterfly valve comprises a valve body adapted for in-line coupling in a conduit section and includes a central bore to pass fluid flowing along the longitudinal axis of the valve. An annular seal having an inner diameter sized smaller than the central valve diameter is disposed on a distal side of the valve body. The butterfly valve further includes a rotatable actuator shaft spanning across the central bore at a slightly offset position from the bore diameter on a proximal side of the seal. The shaft includes a key notch disposed at a position along the shaft which generally bisects the shaft length portion spanning across the bore. One end of the shaft extends beyond the exterior surface of the valve body to enable controlled actuation.

The present butterfly valve further includes a throttle assembly which comprises a throttle plate, a spring plate, a retainer plate, an indexing block and a transfer block. The throttle plate comprises a circular disk having an overall diameter sized slightly less than the diameter of the central bore and greater than the annular seal inner diameter. The throttle plate also includes a central pin having a rounded proximal end and a plurality of spring posts extending from a proximal side of the plate. The central pin is positioned generally at the center of the throttle plate and each spring post are positioned about an equal distance from one another with the distance between the center pin and each post also being about equal.

The circular spring plate couples with the throttle plate and includes a plurality of apertures extending through the spring plate. The apertures are correspondingly positioned with the spring post positions. The spring plate additionally includes a distal shaft groove positioned from the diameter of the spring plate by a corresponding degree of offset to that of the shaft off-center position, and is adapted to engage a portion of the shaft surface. The throttle plate further includes a generally oval-shaped central aperture extending through the spring plate at the center of the spring plate.

The circular retainer plate comprises a proximal shaft groove positioned from the diameter of the retainer plate by a corresponding degree of offset to that of said shaft, and is adapted to engage a portion of the shaft surface. The retainer plate connects to the spring plate with the actuator shaft positioned between the two plates in the corresponding shaft grooves.

The indexing block has a generally rectangular shape adapted for a clearance fit into the shaft key notch and has an aperture positioned on a distal side of the block sized larger than the center pin to key the shaft to the throttle plate. The indexing block has an interior, generally rectangular cavity extending into the block from a proximal side.

The transfer block generally has a rectangular shape adapted to fit within the indexing block interior cavity. The transfer block includes a hemispherical dimple sized to engage the center pin's rounded end.

The butterfly valve additionally includes a stop mechanism to prevent further rotation of the throttle plate when the throttle plate is in a close position which is generally perpendicular to the axis of flow. In operation, rotation of the shaft directly translates to the throttle plate until the close position. At this point, further rotation of the shaft forces the center pin axially in the distal direction via the transfer block to axially displace the throttle plate against the seal to a fully seated position.

Preferably, the butterfly valve additionally comprises a plurality of compression springs, each spring being disposed on each spring post and affixed between a proximal end of the spring post and the spring plate. In this manner, the throttle plate couples with the spring plate in a manner biasing the throttle plate towards the spring plate and allowing the throttle plate to float within the central bore about the spring plate. As a result, an optimal seal between the annular seal and the throttle plate circumference is achieved. In addition, it is preferred that the spring plate additionally comprise a cylindrical recess extending into the spring plate from a distal surface and that the throttle plate additionally comprise a circular central plate extending axially from the circular disk in the proximal direction. The central plate is preferably disposed generally concentric with the circular disk and slip fits into the cylindrical recess when the throttle plate and spring plate are juxtaposed. As a result, the throttle plate can extend axially away from the spring plate when in the closed position without out-gassing any particles present between the retainer plate, spring plate and throttle plate.

Preferably, the annular seal comprises a lip seal ring which is disposed in a counterbore circumscribing the central bore of the valve housing. It is also preferred that the throttle plate have a circumferential edge tapered towards the center of the throttle plate in the distal direction to improve the seal between the throttle plate edge and the annular seal. Desirably, the valve body, actuator shaft, throttle plate, spring plate, retainer plate and indexing block comprise stainless steel, and a transfer block comprising a hard, self-lubricating material such as chlorotrifuoroethylene or acetal resin. It is also preferred that the proximal surface of the spring plate and the distal surface of the retaining plate, which contact the shaft, are coated with a tetrafluoroethylene coating.

In a preferred embodiment, the stop mechanism comprises a cantilever stop extending radially into the central bore from an inner wall of the bore positioned to halt rotation of the throttle assembly when the throttle plate rotates to the perpendicular position. Moreover, it is preferred that the stop mechanism additionally comprise an adjustment mechanism to adjust the perpendicular position of the throttle plate assembly to align it with a plane of the annular seal. It is also preferred that the stop mechanism additionally comprise a second cantilevered stop member extending radially from the spring plate and correspondingly positioned to engage the central bore stop when the throttle plate rotates to the perpendicular position.

In accordance with a preferred method for fully sealing a vacuum system conduit with a butterfly valve positioned by a control system, the method includes the steps of coupling the throttle plate to a rotatable actuator shaft of the valve to translate rotational movement of the shaft to the throttle plate. The shaft is then rotated to position the throttle plate generally perpendicular to the fluid flow in the conduit. At this point, the throttle plate is prevented from further rotation when in the perpendicular position while the shaft is further rotated. Finally, the further rotation of the shaft is directly transmitted to axially displace the throttle plate, causing the throttle plate to seat against an annular seal. In this manner, each increment of rotation of the shaft produces axial displacement of the throttle plate to improve control characteristics. Preferably, the method additionally includes the step of floating the throttle plate within the central bore when in the perpendicular position to a position which maximizes the sealing effect between the throttle plate and the seal valve.

BRIEF DESCRIPTION OF THE DRAWINGS

These and other features of the invention will now be described with reference to drawings of a preferred embodiment which is intended to illustrate, and not to limit, the invention, and in which.

DETAILED DESCRIPTION OF THE PREFERRED EMBODIMENT

Figure 1:
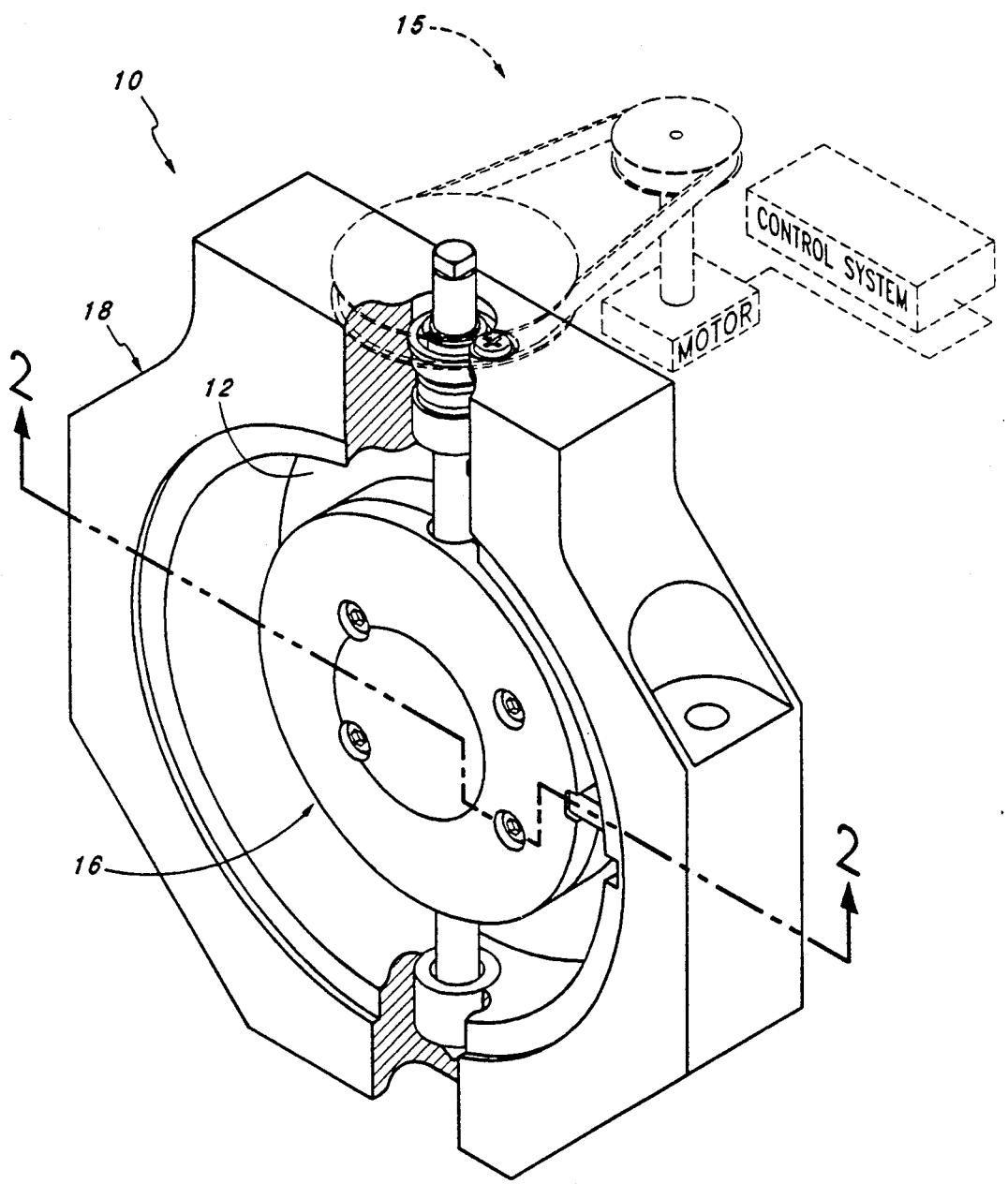
FIG. 1 is a perspective view illustrating from a proximal side a preferred embodiment of a butterfly valve in accordance with the present invention.

FIG. 1 illustrates a preferred embodiment of the present butterfly valve 10 which permits throttling fluid flow through the valve 10 and which fully seals to cease flow. In a close position, i.e., with a throttle plate 12 perpendicular to the flow, the valve 10 seals closed by axial translation of the throttle plate 12. The axial translation of the throttle plate directly corresponds to rotation of an actuator shaft 14, thus improving valve control for the entire range of throttle plate 12 movement from seal to full open.

Preferably, the valve is adapted for installation in a continuous vacuum service, such as systems used in semiconductor processing, operating over a temperature range of 0° C. to 150° C. It is further preferred that a control system 15 drives the actuator shaft 14 to control the throttle plate position within the valve and thus regulate flow rate through the valve.

To improve control characteristics, the valve 10 comprises a self-centering throttle plate assembly 16, which permits the throttle plate 12 to float within the flow channel to achieve a uniform seal around the circumference of the throttle plate 12. As a result, the mass of the rotating throttle plate assembly 16 can be reduced to improve response characteristics of the valve 10.

Figure 3:
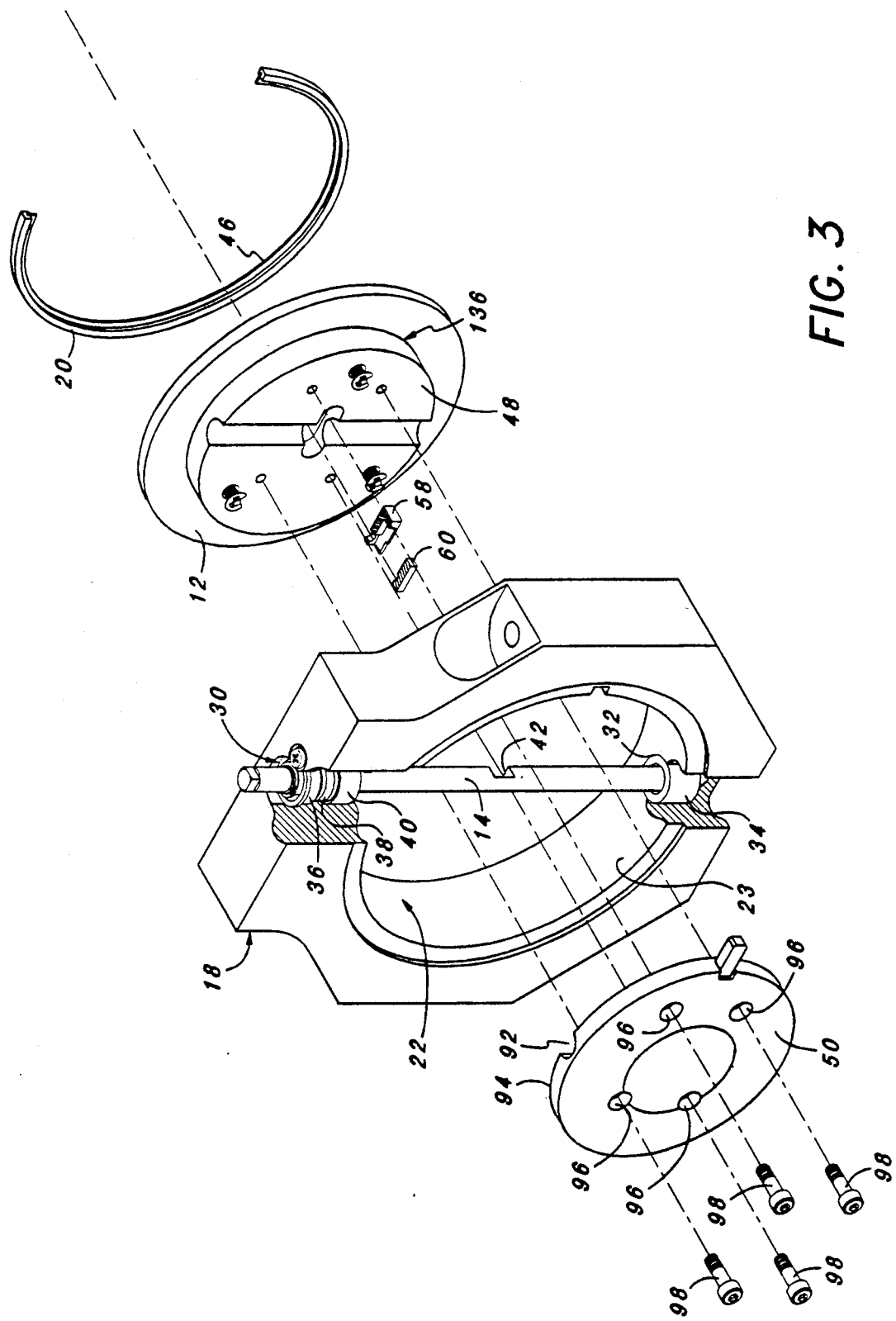
FIG. 3 is a partial exploded perspective view illustrating the valve of FIG. 1, with an indexing block and a transfer block shown in cross section.

Referring now to FIG. 3, the valve 10 principally comprises a valve body 18, a seal 20, an actuator shaft 14 and a throttle plate assembly 16 comprising the throttle plate 12. The throttle plate 12 couples with the actuator shaft 14 in a manner directly transmitting shaft rotation to throttle plate movement. In other words, each increment of shaft rotation produces either rotational or axial displacement of the throttle plate 12. When axially actuated, the throttle plate 12 seats against the seal 20. The individual components of the valve 10 will now be described in detail.

As shown in FIG. 3, the valve body 18 includes a central bore 22 extending through the body 18 for the passage of fluid along a flow channel. The valve body 18 preferably comprises a strong, inert material and more preferably an inert metal alloy such as, for example, Series 300 stainless steal.

Figure 2:
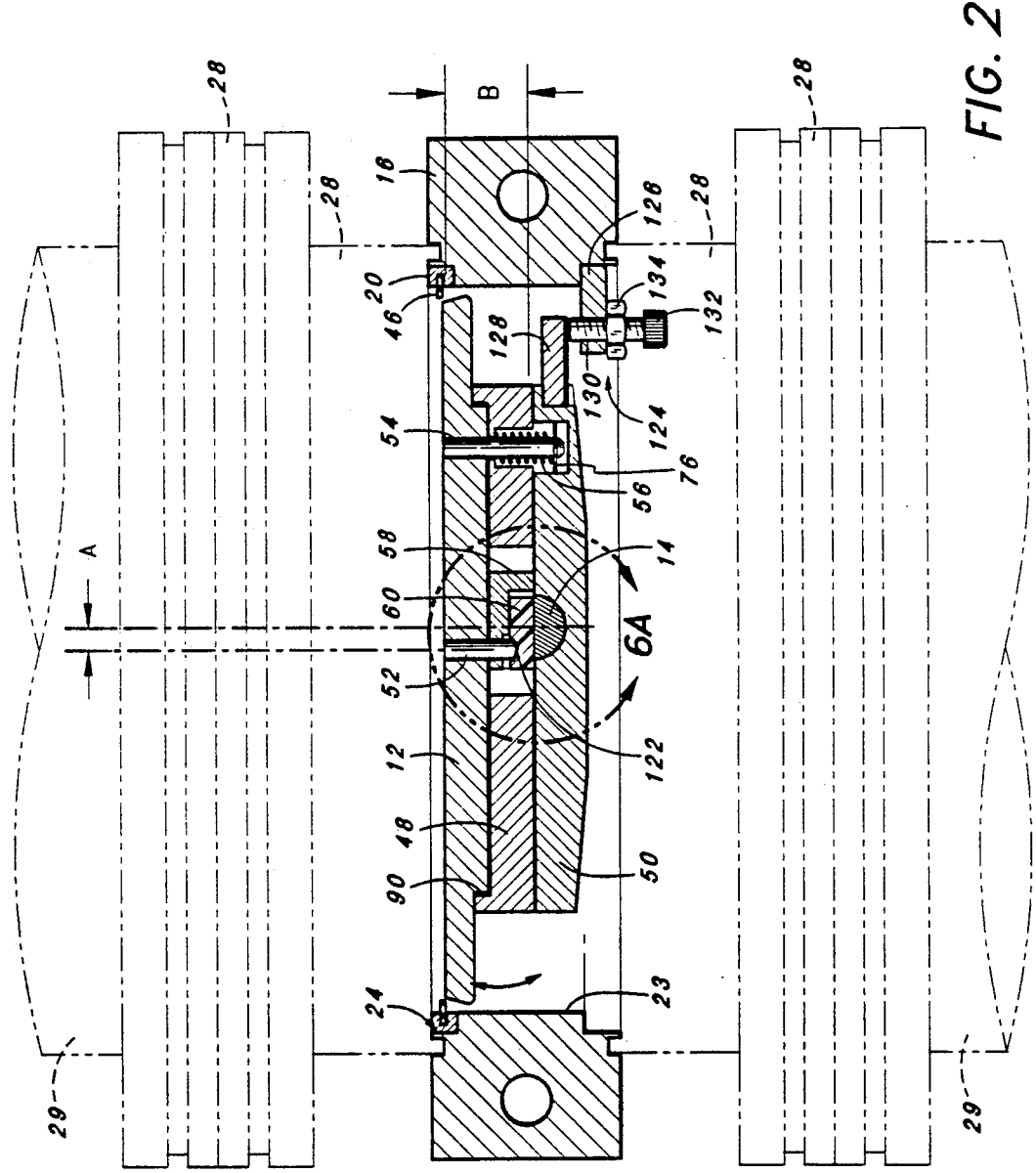
FIG. 2 is a cross-sectional view of the valve of FIG. 1 taken along line 2—2, illustrating a preferred environment of use in phantom lines.

A counter bore 24, circumscribing the central bore 22, extends into the valve body 18 from an exterior surface, as illustrated in FIG. 2. Preferably, the diameter and depth of the counter bore corresponds to the outer diameter and height of the seal 20.

FIG. 2 illustrates, in phantom lines, a pair of flanges 26 attached to the valve body via a pair of flange tubes 28. This structure facilitates installation of the valve 10 in a piping system 29. Preferably, the orientation of the valve 10 when installed in the vacuum system places the counter bore 24, and thus the seal 20, away from a vacuum source, i.e., on the distal side of the valve. As used herein, the terms "proximal" and "distal" are used in reference to the proximity to the vacuum source drawing the fluid through the flow channel. Oriented accordingly, control of valve opening is improved as high pressure assists the valve opening and thus eliminates pressure spike responses experienced in the alternative orientation.

The valve body 18, as illustrated in FIG. 3, additionally comprises an aperture 30 extending through the valve body into the central bore 22 and a blind hole 32 extending from the central bore surface 23 into the valve body 18 diametrically opposite the aperture 30.

Preferably, the position of these holes 30, 32 is slightly off-center from the diameter of the central bore 22, the importance of which is discussed below in reference to the actuator shaft 14.

Referring to FIG. 3, the diameters of the aperture 30 and blind hole 32 accommodate bushing members to aid rotation the actuator shaft 14. Preferably, a reinforced polytetrafluoroethylene compound (e.g., RULON®) bushing 34 inserts into the blind hole 32 to support the end of the actuator shaft 14 in assembly. A roller bearing 36, in combination with an O-ring 38 and shaft seal 40, insert into the aperture 30 and support the shaft 14 passing through the valve body 18. Preferably, a TEFLON®, spring loaded shaft seal 40 is positioned proximate to the central bore 22, with a fluoroelastomer (e.g., VITON®) O-ring 38 and the ball bearing 36 respectively positioned progressively outward in the radial direction, as shown in FIG. 3.

The actuator shaft 14, as best seen in FIG. 3, comprises a cylindrical shaft which inserts through the valve body aperture 30 and into the blind hole 32. Preferably, the shaft 14 spans across the central bore 22 at a slightly off-center position from the central bore diameter; the degree of offset represented in FIG. 2 by dimension A. As known in the art, abrasive wear on the seal is reduced by off-setting the shaft from the central bore diameter to shorten the radial arc defining the travel of the throttle plate periphery edge which sweeps across the seal. A shortened radius causes the periphery edge to pull away at a quicker rate from the seal for the same degree of travel, and thus reduces abrasive wear on the seal. Advantageously, the shaft position falls on the proximal side of a plane of the seal, as illustrated in FIG. 2 by dimension B, to reduce abrasive wear on the seal in a similar fashion, which is also known in the art.

At a position generally bifurcating the section of the shaft 14 spanning the central bore 22, the shaft 14 includes a notch 42 having from an elevational view a generally rectangular shape which extends into the shaft 14 to the shaft longitudinal axis.

The seal 20, as illustrated in FIG. 3, comprises an annular seal ring which inserts into the counter bore 24 of the valve body 18. Preferably, the annular seal ring 20 comprises a self-sealing lip seal, such as MICRO-LIP ™, available commercially from Fluorocarbon Mechanical Seal Division.

As known in the art, a retainer ring (not shown) may secure the seal 20 within the counter bore 24 by attaching the retainer ring to the flange tube 28 at a position clamping the seal 20 between the counter bore 24 and an edge of the retainer ring. Preferably, the exterior surface of the seal 20 is an elastomer which seals itself between the counter bore 24 and retainer ring when compressed. If not self-sealing, O-rings may be used to seal the annular seal 20 in the counter bore 24 as known in the art.

A lip member 46, preferably comprising an inert material, such as, for example, polytetrafluoroethylene (PTFE), cantilevers radially into the central bore 24, as shown in FIG. 2. By positioning the seal on the high pressure side of the valve (i.e., on the distal side), the high pressure deflects the lip member 46 towards the throttle plate 12, thus improving the seal.

Referring to FIG. 3, the throttle plate assembly 16 comprises the throttle plate 12, a spring plate 48, a retainer plate 50, a center pin 52, a plurality of posts 54 and biasing members 56, an indexing block 58 and a transfer block 60. Preferably, all of these components except the transfer block 60 comprise a strong, inert material and more preferably an inert metal alloy such as, for example, Series 300 stainless steal. The transfer block 60 preferably comprises a hard, self-lubricating material such as, for example, acetal resin (e.g., DELRIN®) or chlorotrifluoroethylene (e.g., KEL-F®).

Figure 4:
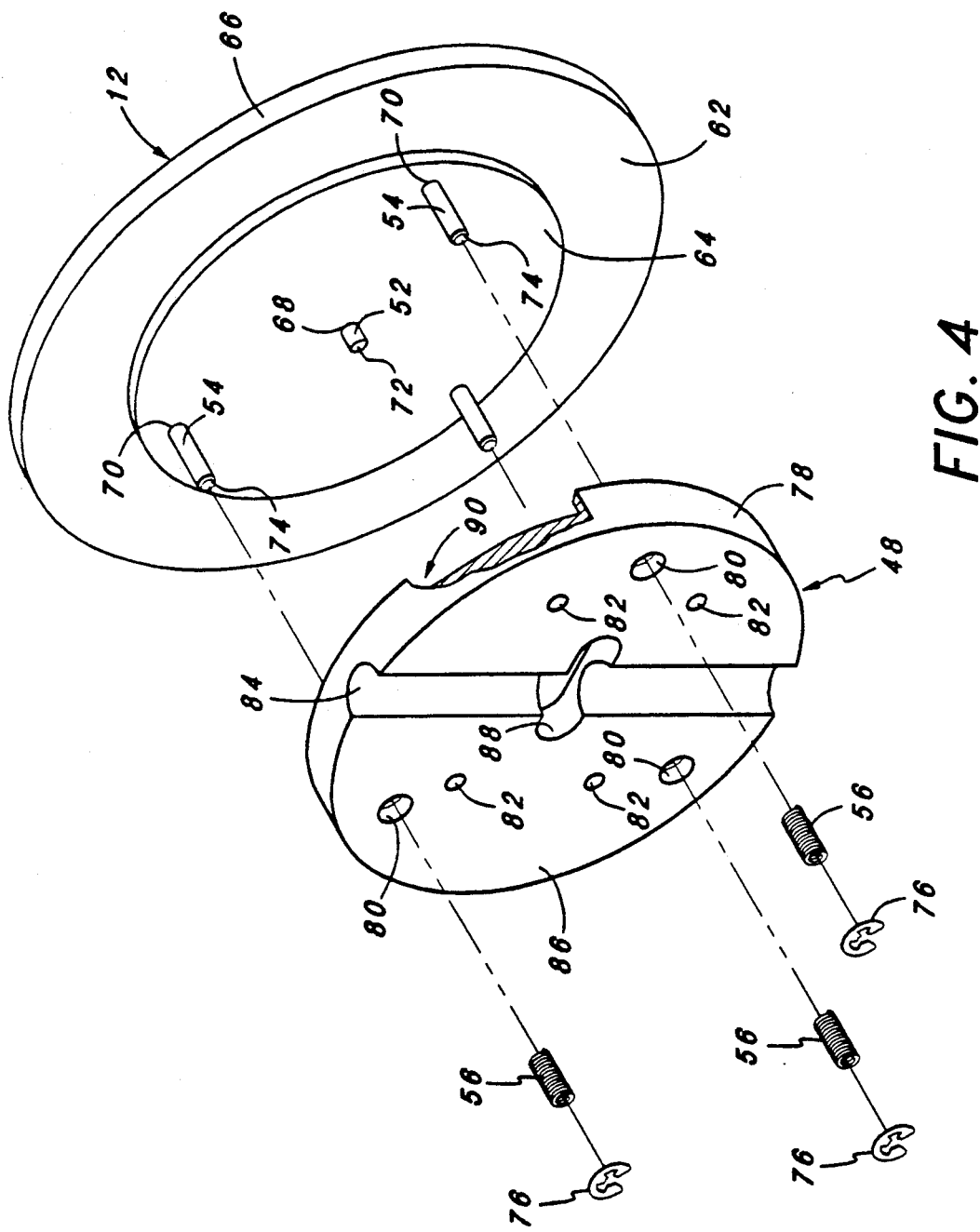
FIG. 4 is an exploded perspective view illustrating several components of a throttle plate assembly of FIG. 3.

As best shown in FIG. 4, the throttle plate 12 comprises a circular disk 62 and a circular center plate 64 having a smaller diameter than the disk 62. The plate 64 is concentrically positioned on the disk 62. Desirably, the disk 62 periphery edge 66 tapers towards the center of the disk 62 in the distal direction, as seen in FIG. 2. The disk tapered periphery edge 66 produces an improved seal with the annular lip seal 20, as known in the art.

The throttle plate 12 additionally comprises a series of apertures extending in the axial direction through the plates 62, 64 and being adapted to receive the center pin 52 and the posts 54. As shown in FIG. 4, the throttle plate 12 includes a center pin aperture 68 at the center of the disk 62. The throttle plate 12 also includes a plurality of post apertures 70, each positioned an equal distance from the center aperture 68 and from one another. Preferably, the throttle plate 12 includes three post apertures 70 positioned in an equilateral triangular arrangement with the center aperture 68 at the geometric center of the triangular arrangement.

The center pin 52 and posts 54 produce interference fits when inserted into the respective apertures. The center pin 52 fills the center pin aperture 68 and extends from the center plate 64 in the in the proximal direction, as shown in FIG. 4. The proximal end 72 of the center pin 52 is rounded to provide a smooth bearing surface. The posts 54 likewise fill the respective apertures 70 and extend from the center plate 64 in the proximal direction. The length of the posts 54 are substantially longer than the length of the center pin 52. At a position proximate to the proximal end of each post 54, an annular groove 74 circumscribes the post 54 having a width adapted to receive a retainer washer 76.

The spring plate 48, which couples to the throttle plate 12 as shown in FIG. 4, comprises a disk body 78 having a diameter smaller that the disk 62 but larger that the center plate 64. The spring plate 48 includes a plurality of apertures 80 extending through the disk body 78 at positions corresponding to the positions of the posts 54. The apertures 80 have diameters larger than the outer diameters of the posts 54 and biasing members 56 to receive the two components 54, 56 during assembly. A plurality of threaded apertures 82 also extends into the disk body 78 to connect the spring plate 48 and retainer plate 50 together in assembly, as shown in FIG. 3.

At a position slightly off-center from the spring plate 48 diameter, a distal shaft groove 84 extends across a proximal surface 86 of the disk body 78. The degree of offset preferably equals that of the shaft position with respect to the central bore (i.e., dimension A of FIG. 2). The shaft groove 84 has a semi-circular shape in cross section of a radius that preferably matches the shaft 14 radius. As a result, the throttle plate 12, coupled to the spring plate 48, positions generally concentric with the central bore 22 of the valve body 18 with the actuator shaft 14 resting in the shaft groove 84 of the spring plate 48.

The spring plate 48 additionally comprises a generally elongated oval slot 88 extending through the disk body 78 at the spring plate 48 center, as shown in FIG.

4. Preferably, a major axis of the elongated oval slot 88 lies generally perpendicular to the longitudinal axis of the shaft groove 86 and extends beyond the overall width of the shaft groove 86 on either side. The length of a minor axis of the oval slot 88 is preferably slightly larger than the width of the shaft notch 42.

On a distal side of the spring plate 48, a cylindrical recess 90 extends into the disk body 78. Preferably, the recess 90 receives the center plate 64 in a slip fit fashion when the spring plate 48 and throttle plate 12 are juxtaposed. As a result, the throttle plate 12 can extend axially, for a distance less than the thickness of the center plate 64, without out-gassing any particles present in the post apertures 70 or the oval slot 88.

Referring to FIGS. 2 and 3, the retainer plate 50 is a circular disk having a diameter preferably equal to the spring plate 48 diameter. The retainer plate 50 includes a proximal shaft groove 92 on a retainer plate distal surface 94 correspondingly positioned to the distal shaft groove 84 of the spring plate 48 at a slightly off-center position. The shaft groove 92 has a semi-circular shape in cross section of a radius that preferably matches the shaft 14 radius. As a result, when the retainer plate 50 connects to the spring plate 48, the grooves 84, 92 form a circular opening through the plate assembly 48, 50 adapted to receive the actuator shaft 14.

Preferably, the engaging sides of the plates 48, 50, i.e., the retainer plate distal surface 94 and the spring plate proximal surface 86, are coated with a self-lubricating material, such as, for example, a tetrafluoroethylene (e.g., TEFLON®) coating. The coating produces a smooth, self-lubricating bearing surface to reduce abrasive wear between the rotating shaft 14 and the surfaces of the grooves 84, 92. Thus, less particles are generated when actuating the throttle plate 12 axially.

The retainer plate 50 preferably includes a plurality of counter-sunk through holes 96 adapted to receive a like number of socket head screws 98 to join the spring plate 48 and retainer plate 50 together. Desirably, the positioning of the screw holes 96 and thread apertures 82 are symmetrical about the longitudinal axis of the shaft grooves 84, 92.

Figure 5:
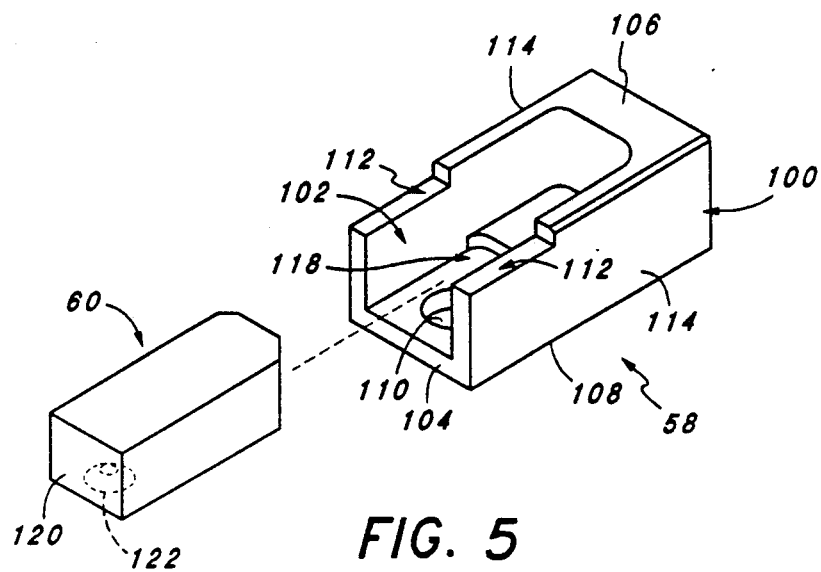
FIG. 5 is a partial exploded perspective view of the valve of FIG. 3 illustrating the indexing block and transfer block.

Referring to FIG. 5, the indexing block 58 comprises a generally rectangular body 100 having a generally rectangular cavity 102 extending from a side surface 104 and a proximal surface 106 into the body 102. The block width preferably equals the width of the shaft notch 42 and the block height is preferably slightly larger than the thickness of the spring plate 48. Desirably, the proximal surface 106 and the distal surface 108 of the indexing block 58 are parallel. As a result, the block 58 indexes the distance between the shaft 14 center-line and the proximal side of the throttle plate 12.

An aperture 110, sized to receive the center pin 52, extends from the distal surface 108 and opens into the cavity 102, as illustrated in FIG. 5. The aperture 110 is positioned proximate to the side surface 104 along the longitudinal axis of the indexing block. In assembly, the center pin 52 inserts through the aperture 110 and the indexing block 58 snugly fits within the shaft notch 42. In this manner, the indexing block 58 keys the throttle plate 12 to the shaft 14 in the longitudinal direction of the shaft 14.

As shown in FIG. 5, the indexing block has a pair of reliefs 112 in the block longitudinal walls 114. Preferably, the height of the reliefs 112 is not greater than 0.100 inches and more preferably equals about 0.030 inches. The length of the reliefs 112 is preferably less than half the length of the indexing block 58, and more preferably extends for a distance such that the distance between the center-line of the aperture 110 and the end of the reliefs 112 generally equals the radius of the actuator shaft 14. Preferably, these distances equal each other within 0.050 inches. The reliefs 112 provide clearance for the circumferential edge 116 of the shaft 14 as it rotates relative to the indexing block 58.

The indexing block 58 also includes a transfer block relief 118 disposed about the aperture 110. The height of the relief 118 permits rotation of the transfer block 60 relative to the indexing block 58. Preferably, the height is on the order of 0.030 inches.

Figure 6A:
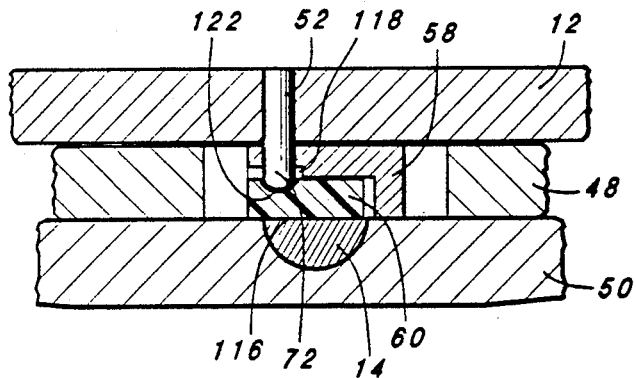
FIG. 6A is a partial enlarged cross-sectional view of the valve shown in FIG. 2 taken along line 6A.

FIG. 5 additionally illustrates the transfer block 60 as having a generally rectangular shape which generally fills the rectangular cavity 102 of the indexing block 58. Advantageously, the transfer block 60 height equals the height of the rectangular cavity 102. Proximate to a side surface 120 along the transfer block 60 longitudinal axis, the transfer block 60 includes a hemispherical dimple 122 adapted to receive the rounded end 72 of the center pin 52. Preferably, the dimple 122 positioning coincides with location of the shaft circumferential edge 116 located on the opposite side of the transfer block 60 during assembly, as shown in FIG. 6A.

Referring to FIG. 2, the valve 10 additionally includes a stop mechanism 124 to halt rotation of the throttle plate 12 after rotating to the close position (i.e., the position perpendicular to the fluid flow). Preferably, the stop mechanism 124 comprises an adjustment means to adjust the positioning of the throttle plate 12 in the close position to lie parallel with the plane formed by the seal 20.

FIG. 2 illustrates the stop mechanism 124 as comprising a stop member 126 cantilevered from the central bore surface 23 on the proximal side of the actuator shaft 14 and a second stop member 128 cantilevered from the retainer plate 50 in the radial direction, positioned to engage the first stop member 126 when rotated into the close position. Preferably, the first stop member 126 includes a threaded hole 130 adapted to receive a screw 132. The position of the screw 132 relative to the first stop member 126 may be controlled by a nut 134, as known in the art. In assembly, the end of the screw 132 engages the second stop member 128 in the close position. By controlling the screw position, the throttle plate 12 position within the central bore 22 at the close position may be adjusted.

Although FIG. 2 illustrates the stop mechanism 124 as comprising a first 126 and second stop member 128 cantilevered into the central bore 22, it is understood that other stop mechanisms, such as a single cantilevered member, may be used as well.

Referring now to FIGS. 1 through 3, the throttle plate 12 couples to the actuator shaft 14 by a biasing mechanism 136 formed by the spring plate 48, biasing members 56 and posts 54. The posts 54, attached to the throttle plate 12, insert through the apertures 70 in the spring plate 48. The biasing members 56, preferably helical compression springs, position over the posts 54 in a compressed position with the retainer washers 76, contained in the posts annular grooves 74, affixing the biasing members 56 on the posts 54.

The throttle plate assembly 16 couples to the shaft 14 with the joining of the spring plate 48 and retainer plate 50 around the shaft 14. The plurality of screws 96 connect the plates 48, 50 together, as illustrated in FIG. 3.

In assembly, the indexing block 58 and transfer block 60 fit within the cavity defined between the shaft notch 42 and the oval slot 88 of the spring plate 48, as shown in FIG. 2. FIG. 6A illustrates the center pin rounded end 72 extending through the indexing block aperture 110 to sit within the transfer block dimple 122. As discussed above, the indexing block 58 keys the throttle plate 12 to the actuator shaft 14 in the shaft longitudinal direction and controls the height between the shaft 14 center-line and the throttle plate 12 when the throttle plate 12 is biased towards the shaft 14.

Advantageously, the present valve design produces a fully sealing butterfly valve with improved control characteristics. Shaft 14 rotation directly translates to throttle plate 12 movement, thereby eliminating looseness or play which causes mechanical hysteresis leading to control problems. Play between the actuator shaft 14 and the throttle plate 12 produces different throttle plate positions depending upon the direction of travel of the throttle plate. At a given shaft position, the throttle plate position will vary depending upon whether the valve is opening (i.e., movement in the direction from the seal position) or closing (i.e., movement in the direction from the fully open position to the seal position). Precision control, however, requires that a one-to-one correspondence exist between the shaft position and the throttle plate position. In other words, the system must be dynamically repeatable in both directions. In the present valve design, each increment of shaft rotation produces throttle plate movement, either rotationally or axially. Moreover, the actuator shaft position relates to a precise valve position, regardless of whether the valve is opening or closing. Consequently, shaft position always translates into an exact throttle plate position to improve valve control.

The biasing mechanism 136 forces the throttle plate 12 towards the shaft 14 and against the indexing block 58 in a retracted position, as shown in FIG. 2. Therefore, rotation of the actuator shaft 14 causes rotation of the indexing block 58 and the throttle plate 12. As illustrated in FIG. 2, clockwise shaft 14 rotation rotates the throttle plate 12 from the full open position to the close position. Although FIG. 2 illustrates clockwise valve closure, it is understood that the positioning of the stop mechanism and shaft may be designed for counter-clockwise valve closure.

FIG. 6A illustrates that in the retracted position, the indexing block 58 is parallel to the shaft notch 42 and transfer block 60. The throttle plate 12 rotates to the close position where the stop mechanism 124 halts rotation of the throttle plate 12.

Figure 6B:
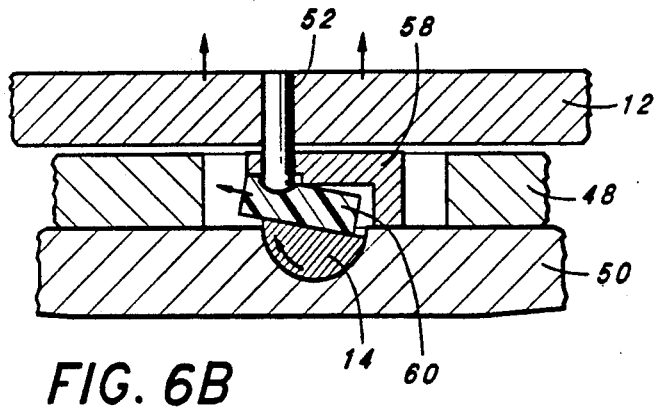
FIG. 6B is a schematic illustration of the valve shown in FIG. 6A illustrating the rotational displacement of a shaft directly translating to axial displacement of the throttle plate.
Figure 7:
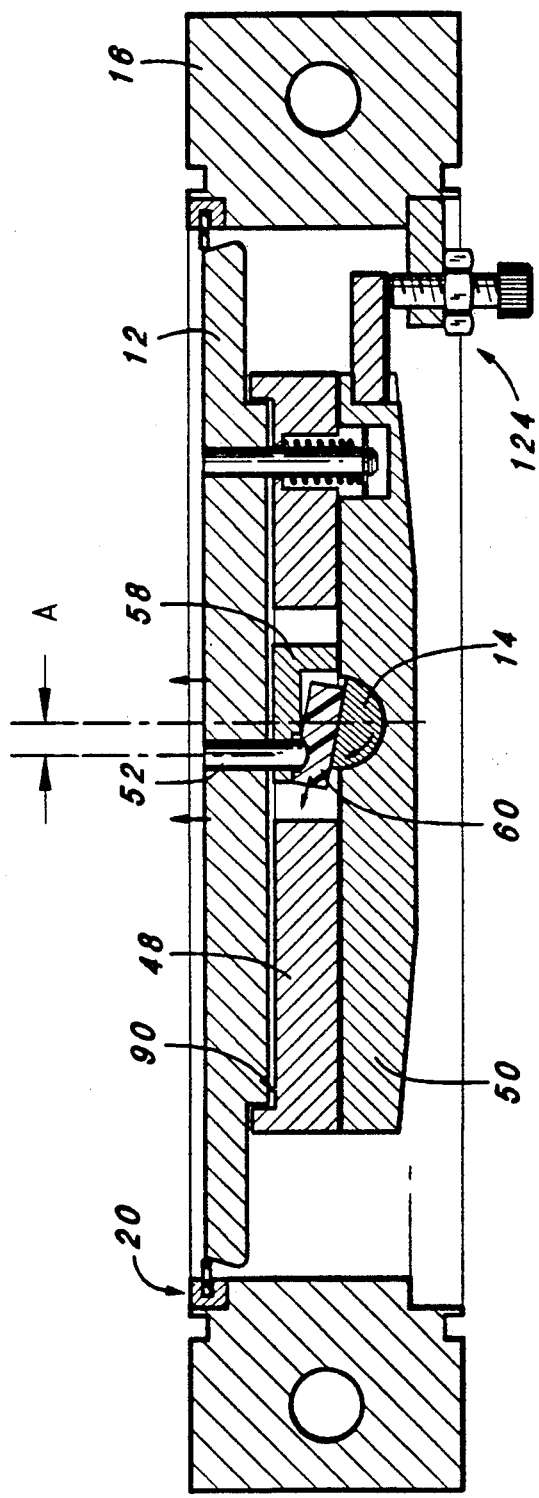
FIG. 7 is a cross-sectional view of the valve of FIG. 2 with the throttle plate axially extended.

Further rotation of the shaft 14 axially displaces the throttle plate 12, as illustrated in FIG. 6B. Shaft 14 rotation axially displaces the transfer block side surface 120 by an amount proportional to the tangent of the angle of rotation. Preferably, the angle of rotation is less than 45 degrees, and more preferably less than 20 degrees. Thus, the preferred amount of maximum axial displacement of the transfer block 60 at the shaft circumferential edge 116 is about 0.040 inch.

As the transfer block side surface 120 moves axially, the transfer block 60 slides over the notch 42 surface, as illustrated in FIG. 6B, to maintain contact with the rounded end 72 of the center pin 52. The center pin rounded end 72 slides over the curved surface of the of the hemispherical dimple 122. Consequently, the axial displacement of the transfer block 60 at the shift circumferential edge 116 directly transfers to axially displace the center pin 52, and thus the throttle plate 12, while maintaining constant contact.

The force required to axially displace the throttle plate 12 constantly acts against the biasing force produces by the biasing coupling mechanism 136. As a result, no play exists in the assembly throughout the entire travel of the throttle plate 12 from the full open position to the seal position.

The control characteristics of the valve 10 are further improved by the self-centering throttle plate design of present invention. As described above, the throttle plate 12 couples to the spring plate 48 by a plurality of posts 54 equally distanced from the plate center. The throttle plate 12 floats about these posts 54 by the degree of clearance between the biasing members 56 surrounding the posts 56 and the spring plate apertures 70. As a result, in the close position, the throttle plate 12 can move by a limited degree within the plane defined by the seal 20.

As the throttle plate 12 moves axially through the plane of the seal 20, the throttle plate centers about the seal 20. The axial movement of the throttle plate 12 causes the tapered periphery edge 66 of the throttle plate 12 to engage the seal lip 46. The continued axial movement funnels the throttle plate 12 into the annular opening formed by the inner edge of the lip seal 20. In a seal position, the throttle plate shifts to an equilibrium position where the engagement force between the periphery edge 66 and the seal lip 46 is equal about the circumference of the throttle plate 12. By allowing a limited degree of plate movement within the seal plane, the plate 12 can adjust within the central bore 22 to center itself about the annular seal 20. Self-centering is achieved by spring loading the throttle plate 12 off the shaft 12 axis, thus allowing the throttle plate 12 to float about the supports, i.e., the posts 54.

The self-centering throttle plate design produces improved control characteristics. In the present valve design, the quality of the resulting seal relies upon the exact centering of the throttle plate 12 about the annular seal 20, instead of a massive engagement force between the throttle plate and the seal, as taught by the prior art. As a result, the size and mass of the components can be decreased because the components no longer require the structural integrity to withstand the massive engagement forces. Reduced rotated mass, especially in the throttle plate, improves the response characteristics of the valve design. Thus, control characteristics are enhanced.

In addition to the improved control characteristics, the present valve design limits internal space (i.e., dead volume) within the throttle plate assembly to reduce the volume of fluid out-gassed during pressure changes which improves system efficiency. The throttle plate assembly design also has a low profile in the full open position to reduce flow resistance across the valve and provides for easy removal of the throttle plate during maintenance. Finally, the present design is simplistic, thus saving on manufacturing costs and reducing the likelihood of valve failure.

Although this invention has been described in terms of certain preferred embodiments, other embodiments that are apparent to those of ordinary skill in the art are also within the scope of this invention. Accordingly, the scope of the invention is intended to be defined only by the claims which follow.

What is claimed is:

1. A fully sealing butterfly valve adapted for application in high vacuum systems used in semiconductor processing, comprising:

a valve body adapted for in-line coupling in a conduit section comprising a central bore to pass fluid flowing along the longitudinal axis of said valve;

an annular seal having an inner diameter sized smaller that said central valve diameter and being disposed on a distal side said valve body;

a rotatable actuator shaft spanning across said central bore at a slightly off-center position from said bore diameter on a proximal side of said seal, said shaft comprising a key notch disposed at a position along said shaft generally bisecting said shaft length portion spanning across said bore, said shaft extending beyond an exterior of said valve body to enable controlled actuation;

a throttle assembly comprising, a throttle plate comprising a circular disk having an overall diameter sized slightly less than the diameter of said central bore and greater that said annular seal inner diameter, said throttle plate having a center pin having a rounded proximal end and a plurality of spring posts extending from a proximal side of said plate, said center pin positioned generally at the center of said throttle plate and each spring post positioned about an equal distance from one another with the distance between said center pin and each post being about equal;

a circular spring plate coupled with said throttle plate comprising a plurality of apertures extending through said spring plate and correspondingly positioned with said spring posts positions, a distal shaft groove positioned from the diameter of said spring plate by a corresponding degree of offset to that of said shaft off-center position, and adapted to engage a portion of said shaft surface, and a generally elongated oval central aperture extending through said spring plate at about the center of said spring plate;

a circular retainer plate comprising a proximal shaft groove positioned from the diameter of said retainer plate by a corresponding degree of offset to that of said shaft off-center position, and adapted to engage a portion of said shaft surface, said retainer plate connecting to said spring plate with said actuator shaft positioned between the two plates;

an indexing block comprising a generally rectangular shape adapted for a clearance fit into said shaft notch and having an aperture positioned on a distal side of said block sized to receive said center pin to key said shaft to said throttle plate, said indexing block comprising an interior, generally rectangular cavity extending into said block from a proximal side; and a generally rectangular transfer block adapted to fit within said indexing block interior cavity, said transfer block comprising a hemispherical dimple sized to engage said center pin rounded end; and a stop mechanism to prevent further rotation of said throttle plate when in a close position generally perpendicular to the axis of flow, wherein the rotation of said shaft directly translates to said throttle plate until said close position, at which point further rotation of said shaft forces said center pin axially in the distal direction via said transfer block to axially displace said throttle plate against said seal to a fully seated position.

2. The valve of claim 1, additionally comprising a plurality of compression springs, each compression spring being disposed on each spring post and affixed between a proximal end of said spring post and said spring plate to couple said throttle plate with said spring plate, wherein said throttle plate moves axially away from said spring plate when said shaft acts upon said center pin and floats within said central bore about said spring plate to produce an optimal seal between said annular seal and said throttle plate circumference.

3. The valve of claim 2, wherein said spring plate additionally comprising a cylindrical recess extending into said spring plate from a distal surface and said throttle plate additionally comprises a circular center plate extending axially from said circular disk in the proximal direction and disposed generally concentric with said circular disk, said center plate slip fitting into said cylindrical recess when said throttle plate and spring plate are juxtaposed to permit the axial extension of said throttle plate away from said spring plate when in the perpendicular position without out-gassing any particles present between the retainer plate, spring plate and throttle plate.

4. The valve of claim 1, wherein said annular seal comprises a lip seal ring.

5. The valve of claim 4, wherein said lip seal ring is disposed in a counter bore circumscribing said central bore on a distal side of said valve body.

6. The valve of claim 1 wherein said throttle plate has a circumferential edge tapered towards said plate center in the distal direction to improve the seal between said edge and said annular seal.

7. The valve of claim 1, wherein said valve body, actuator shaft, throttle plate, spring plate, retainer plate and indexing block comprises stainless steel.

8. The valve of claim 1, wherein said transfer block comprises a hard, self-lubricating material.

9. The valve of claim 8, wherein said hard, self-lubricating material is selected for a group consisting of chlorotrifluoroethylene and acetal resin.

10. The valve of claim 1, wherein a proximal surface of said spring plate and a distal surface of said retainer plate, which contact said shaft, are coated with a tetrafluoroethylene coating.

11. The valve of claim 1, wherein said stop mechanism comprises a cantilevered stop extending radially into the central bore from an inner wall of said bore positioned to halt rotation of said throttle assembly when said throttle plate rotates to said perpendicular position.

12. The valve of claim 11, wherein said stop mechanism additionally comprises an adjustment mechanism to adjust the perpendicular position of said throttle assembly to align with a plane of said annular seal.

13. The valve of claim 11, wherein said stop mechanism additionally comprises a cantilevered stop extending radially from said spring plate and correspondingly positioned to engage said central bore stop when said throttle plate rotates to said perpendicular position.

14. The valve of claim 1, additionally comprising a plurality of bushing members supporting said shaft at at least two positions within said valve body.

15. The valve of claim 14, additionally comprising at least one shaft seal disposed between said central bore and said bushing members to prevent egression of fluid within said central bore along said shaft.

16. A butterfly valve for throttling fluid flow through a conduit, said valve coupled to a control system to regulate the flow rate by periodically adjusting the valve positioning, comprising:
   a valve body adapted for in-line coupling in a conduit section comprising a central bore to pass fluid flowing along the longitudinal axis of said valve;
   an annular seal having an inner diameter and disposed proximal to said valve body;
   a rotatable actuator shaft passing through said central bore in the radial direction and having a key notch;
   a circular throttle plate disposed within said central bore, rotatable from an open position to a close position, comprising an overall diameter sized larger than said seal inner diameter and a pin extended axially and positioned to generally align with a circumferential edge of said shaft;
   a coupling mechanism biasing said throttle plate towards said shaft to directly communicate rotation of said shaft to said throttle plate when rotating from said open position to said close position; and
   a transfer block disposed in said shaft key notch and coupling said shaft with said pin such that, as said shaft continues to rotate past said close position, said circumferential shaft edge forces said pin axially via said transfer block to fully seat said throttle plate against said seal, said transfer block adapted to side within said key notch to maintain contact with said pin and to directly transmit rotational displacement of said shaft to axial displacement of said throttle plate.

17. The valve of claim 16, wherein said coupling mechanism comprises a plurality of spring posts attached to a proximal side of said throttle plate, a plurality of biasing members, at least one member disposed about each post, and a platter connected to said shaft having a plurality of apertures extending through said platter and correspondingly positioned to permit said posts to extend through said platter when juxtaposed to said throttle plate, said biasing members attached onto said posts in a position between a proximal end of said posts and said platter to couple said throttle plate with said platter.

18. The valve of claim 16, additionally comprising an indexing block having a generally rectangular shape sized to snugly fit within said shaft key notch and an aperture positioned to receive said pin to key said throttle plate with said shaft in the radial direction.

19. The valve of claim 18, wherein said indexing block is sized to control the distance and parallelism between said throttle plate and shaft with said throttle plate biased towards said shaft.

20. A butterfly valve for throttling fluid flow through a conduit, said valve coupled to a control system to regulate the flow rate by periodically adjusting the valve position, said butterfly valve comprising:
   a valve body defining a central bore;
   a seal being disposed proximate to said valve body;
   a rotatable actuator shaft being adapted to couple to the control system controlling the rotational position of said shaft, said actuator shaft being disposed in said central bore; and
   a throttle plate rotatable within said central bore to a closed position, said throttle plate coupling with said actuator shaft to directly communicate rotational translation of said shaft to said throttle plate throughout the rotational travel of said throttle plate, and, in said closed position, to directly translate rotation of said shaft to axially displace said throttle plate to fully seat said plate against said actuator shaft, the rotation of said actuator shaft directly translating into axial displacement of said throttle plate via a transfer block and a pin coupling, said pin extending axially from said throttle plate in the proximal direction and being positioned to generally align with a circumferential edge of said shaft, said transfer block being disposed between a notch in said shaft and said pin, said transfer block being slidable within said notch to maintain contact with said pin as said shaft rotates past said closed position.

21. The valve of claim 20, wherein said throttle plate couples to said shaft by a coupling mechanism which biases said throttle plate towards said shaft to directly communicate rotation of said shaft to said throttle plate when rotation to and from said closed position.

22. A fully seating butterfly valve for throttling fluid flow through a conduit, comprising:
   a valve body being adapted for in-line coupling in the conduit and defining a central bore through which fluid flows along a longitudinal axis of said valve;
   an annular seal being disposed proximate to said valve body and having an inner diameter size smaller than said central bore;
   a rotatable actuator shaft passing through said central bore in a radial direction;
   a circular bore throttle plate being disposed within said central bore and having an overall diameter sized larger than said seal inner diameter, said throttle plate including a plurality of posts extending generally axially from said throttle plate towards said shaft and being positioned about equal distances from a central point of said throttle plate and from one another;
   a platter connected to said shaft having a plurality of apertures extending through said platter and being correspondingly positioned to permit said posts to extend through said platter when juxtaposing said throttle plate;
   a plurality of biasing members, at least one biasing member being disposed about each post and being affixed thereon in a position between a proximate end of said post and said platter, coupling together said throttle plate and said platter and permitting said throttle plate to float within said central bore about said platter when in said closed position; and
   a retainer plate being attached to said platter, said platter and said retainer plate comprising corresponding shaft grooves, each shaft groove being positioned to surround generally half of said shaft diameter, thereby encapsulating said shaft in said grooves when said platter and said retainer plate are attached.

* * * * *